United States Patent
Cyrille et al.

(10) Patent No.: US 7,360,296 B2
(45) Date of Patent: Apr. 22, 2008

(54) METHOD FOR REDUCING DAMAGE TO SLIDERS DURING LAPPING

(75) Inventors: Marie-Claire Cyrille, San Jose, CA (US); Prakash Kasiraj, San Jose, CA (US); Huey-Ming Tzeng, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 423 days.

(21) Appl. No.: 10/957,098

(22) Filed: Sep. 30, 2004

(65) Prior Publication Data

US 2006/0064866 A1    Mar. 30, 2006

(51) Int. Cl.
*G11B 5/187*    (2006.01)
*B24B 1/00*    (2006.01)

(52) U.S. Cl. .............. 29/603.12; 29/603.16; 29/603.18; 451/41; 360/122; 360/125

(58) Field of Classification Search .......... 29/603.12, 29/603.09, 603.04, 603.07, 603.13, 603.15, 29/603.16, 603.18; 451/41; 360/313, 322, 360/324, 122, 125
See application file for complete search history.

(56) References Cited

U.S. PATENT DOCUMENTS

| 4,675,986 | A | * | 6/1987 | Yen .................. 29/603.14 X |
| 5,111,352 | A | | 5/1992 | Das et al. |
| 5,600,880 | A | * | 2/1997 | Santini et al. ........... 29/603.14 |
| 5,867,889 | A | * | 2/1999 | Dovek et al. ............ 29/603.13 |
| 6,176,005 | B1 | * | 1/2001 | Garfunkel et al. ....... 29/603.14 |
| 6,219,205 | B1 | | 4/2001 | Yuan et al. |
| 6,496,334 | B1 | | 12/2002 | Pang et al. |
| 6,556,389 | B1 | | 4/2003 | Boutaghou et al. |
| 6,657,825 | B2 | | 12/2003 | Ho |
| 2002/0089794 | A1 | | 7/2002 | Chang et al. |
| 2004/0032696 | A1 | | 2/2004 | Johnson et al. |
| 2004/0033763 | A1 | | 2/2004 | Bunch et al. |

FOREIGN PATENT DOCUMENTS

JP    5-217123    *    8/1993

* cited by examiner

*Primary Examiner*—A. Dexter Tugbang
(74) *Attorney, Agent, or Firm*—G. Marlin Knight (57) ABSTRACT

A process is described for fabricating sliders with reduced lapping damage to the hard-bias materials. The stack of layers for the magnetic sensor is deposited on a wafer and patterned into an initial shape. The hard-bias structures are fabricated at the side of the magnetic sensor as in the prior art. In each of the two described embodiments of the invention, the hard-bias material below the ABS is reduced or removed and replaced with a fill material such as alumina. A first embodiment reduces the hard-bias material below the ABS by forming an extended lapping gap along the ABS in both the sensor and hard-bias material. A second embodiment forms a photoresist mask over the sensor and the portion of the hard-bias/lead structures above the ABS and the exposed hard-bias/lead material below the ABS is thinned or completely removed by milling.

8 Claims, 7 Drawing Sheets

«METHOD FOR REDUCING DAMAGE TO SLIDERS DURING LAPPING»

BACKGROUND OF THE INVENTION

1. Field of the Invention

This invention relates in general to sliders for use in magnetic storage devices, and more particularly to slider fabrication methods and slider designs that facilitate fabrication and even more particularly to fabrication methods and slider designs which minimize damage to thin film components during lapping.

2. Description of Prior Art

Figure 1:
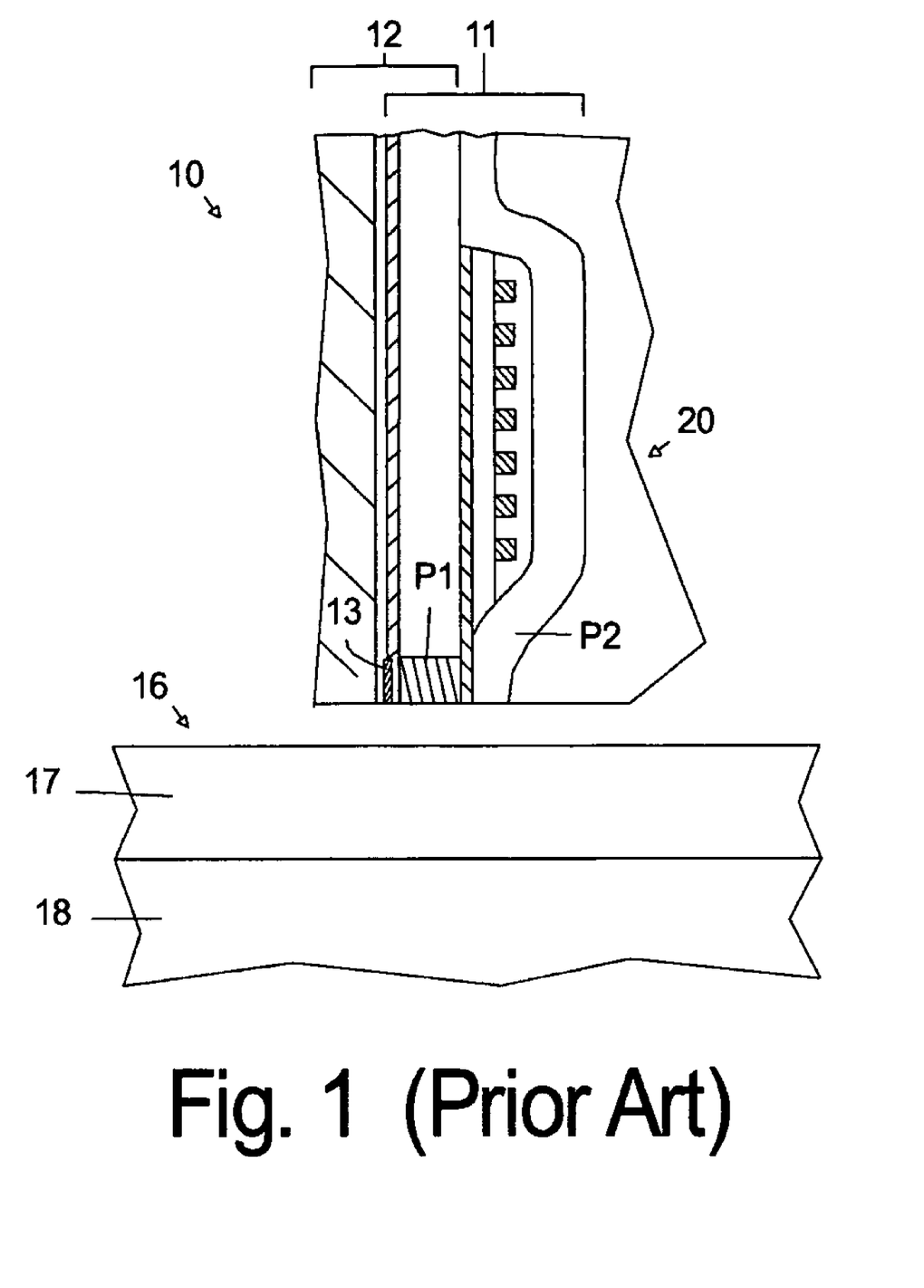
FIG. 1 is a simplified drawing illustrating the head and disk components of a prior art magnetic disk drive system.

A typical prior art a disk drive system 10 using magnetic recording is illustrated in FIG. 1. In operation the magnetic transducer (slider) 20 is supported by the suspension (not shown) as it flies above the rotating disk 16. The magnetic transducer 20, usually called a "head" or "slider," is composed of elements that perform the task of writing magnetic transitions (the write head 11) and reading the magnetic transitions (the read head 12). The side of the slider that is in proximity to the disk surface is the air-bearing surface (ABS). The slider 20 is positioned over points at varying radial distances from the center of the disk 16 to read and write circular tracks (not shown). The disk 16 is attached to a spindle (not shown) driven by a spindle motor (not shown) to rotate the disk 16. The disk 16 comprises a substrate 18 on which a plurality of thin films 17 are deposited. The thin films 17 include ferromagnetic material in which the write head 11 records the magnetic transitions in which information is encoded.

During the fabrication process the materials and structures for the ABS conventionally extend beyond the ABS. The material below the ABS plane is removed by lapping to achieve precise control of the length of the sensor 13 (which is called the "stripe height"). The uncertainty of the saw plane placement causes variations in the stripe height which are on the order of microns and which would lead to unacceptable variations in magnetic performance if not corrected. Lapping is the process used in the prior art to achieve much tighter stripe height control in the nanometer range.

In the typical process of fabricating thin film magnetic transducers, a large number of transducers are formed simultaneously on a wafer. After the basic structures are formed the wafer may be sawed into quadrants, rows or individual transducers. Further processing may occur at any or all of these stages. Although sawing has been the typical method for separating the wafers into individual sliders, recently reactive ion etching (RIE) or deep reactive ion etching (DRIE) with a flourine containing plasma has been used. The surfaces of the sliders perpendicular to the surface of the wafer that are exposed when the wafers are cut form the air bearing surface (ABS) of the slider.

After lapping, features typically called "rails" are formed on the ABS of the slider. The rails have traditionally been used to determine the aerodynamics of the slider and serve as the contact area should the transducer come in contact with the media either while rotating or when stationary.

Sliders may be lapped in rows, but it may be advantageous to have the individual sliders cut out prior to lapping. Even though the sliders have been separated, it is possible to lap several at one time by attaching them to carrier. The time required to lap sliders is a significant element in the cost of manufacturing; therefore, there is a need to improve production efficiency by reducing lapping time, and achieve an ABS surface with a greater control of flatness parameters.

As the slider body is made of rather hard material, such as alumina oxide ($Al_2O_3$) and titanium carbide (TiC), diamond abrasives are used to remove slider material in a precision manner. These diamond abrasives also generate high stresses in the sensor material during lapping that lead to degraded sensor outputs. It has been discovered that the lapping process damages the structure of the ferromagnetic hard-bias material at the surface so that inconsistent signal amplitudes and low yields are obtained. One method that has been shown to be effective in reducing lapping-induced damages is to embed the sensor away from the lapping surface.

Figure 2A:
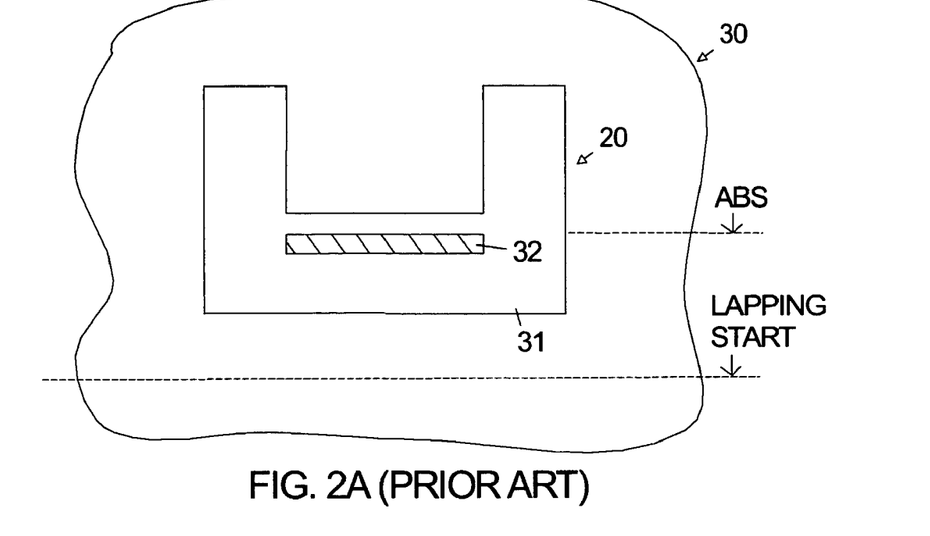
FIG. 2A is a symbolic illustration of a plan view of a head which is being fabricated a wafer by a prior art process after the sensor layer stack has been deposited and patterned with a lapping gap.
Figure 2B:
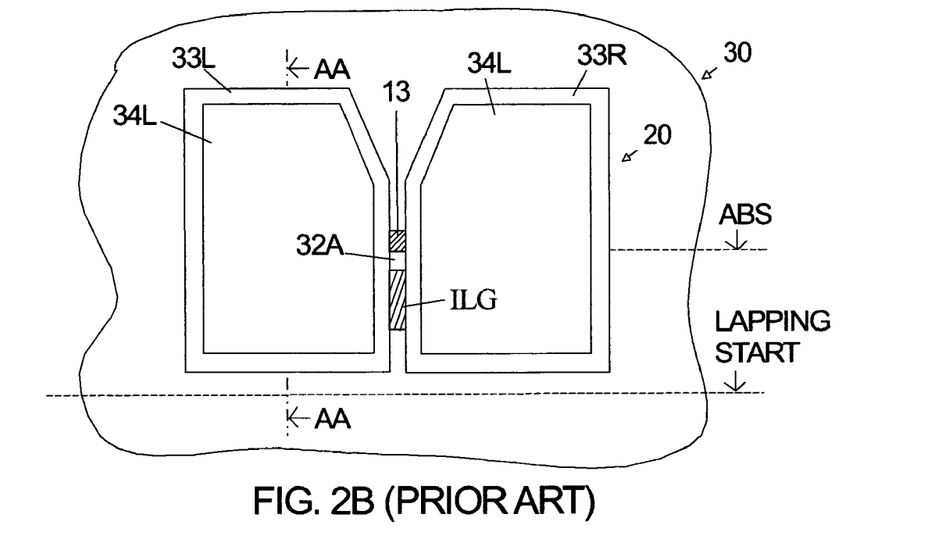
FIG. 2B is a symbolic illustration of a plan view of a head which is being fabricated a wafer by a prior art process after the hard-bias/lead structures have been on the structure shown in FIG. 2A.
Figure 2C:
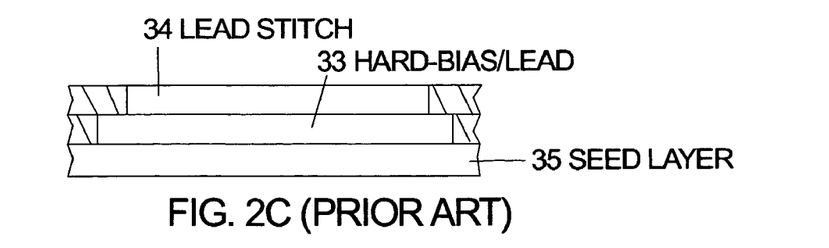
FIG. 2C is a symbolic illustration of a section (M) view of the head of FIG. 2B taken perpendicular to the wafer surface.

FIGS. 2A-C will be used to illustrate aspects of an existing fabrication process for heads with embedded sensors. A large number of identical heads 20 are produced on each wafer 30. As shown the head is partially completed with the read sensor only. The phase of the process in which the sensor layer structure is deposited will be called "K3". The phase of the process which forms the hard-bias structure and defines the sensor width is also known as the "K5" stage of the process. The "K6" stage defines the lead stitch. The layering of the sensor follows the sequence of seed layer, K3, K5 and K6. After the layer stack for the sensor is deposited on the wafer, the K3 mask is laid over the sensor layer to pattern the sensor material into shape 31, shown in FIG. 2A, which defines the sensor stripe height along the longitudinal direction. Also formed at this step is a lapping gap 32 which is located along the eventual ABS line in front of the final sensor. The lapping gap 32 is filled with alumina. Following the K3 step, a K5 mask defines the shape and location of the hard-bias/lead structure 33 to define the width of the sensor 13 as shown in FIG. 2B. The hard-bias/lead structures 33L, 33R extend below the ABS in the longitudinal direction closer to lapping start line. A K6 mask is deposited over the K5-defined region to make lead stitches 34L, 34R. The remaining portion of the lapping gap 32A separates the sensor from an in-line lapping guide (ILG) which is made of the same material as the sensor and is electrically connected with the sensor in parallel between the leads.

FIG. 2C is section of the head 20 of FIG. 2A taken along line M perpendicular to the surface of the wafer. The seed layer 35 for the hard-bias/lead material 33 is the lowest layer shown.

The electrical resistance between the leads is initially the parallel combination of the resistances of the sensor and the in-line lapping guide (ILG). Lapping starts at a distance far away from the sensor structure proceeds in the longitudinal direction eventually ends at the lower end of the sensor as indicated in FIG. 2B. The fabrication process for embedded sensor has been successful in reducing damage to the sensor during lapping. However, the hard-bias (HB) material 33 is still subjected to lapping damage.

Methods for reducing the damage to the hard-bias material during lapping are needed.

SUMMARY OF THE INVENTION

A process will be described for fabricating sliders with reduced lapping damage to the hard-bias materials. The stack of layers for the magnetic sensor is deposited on a wafer and patterned into an initial shape. The hard-bias structures are fabricated at the side of the magnetic sensor as in the prior art. In each of the two embodiments of the invention which will be described, the hard-bias material below the ABS is reduced or removed to form voids and is replaced with a fill material such as alumina. The lead stitches are formed last as in the prior art. The sliders are cut from the wafer and lapped down to the ABS. Since the hard-bias material below the ABS has been reduced or removed, the damage to hard-bias material during lapping is reduced. A first embodiment of the method of the invention reduces the hard-bias material below the ABS by forming an extended lapping gap along the ABS in both the sensor and hard-bias material. Sufficient electrically conductive material can be left at the sides and below the lapping gap to maintain the electrical connection to the in-line lapping guide (ILG), which is located below the lapping gap, until the last portion of lapping. A second embodiment of the method of the invention defines the initial sensor shape first with a lapping gap being included in the initial pattern and then forms the hard-bias/lead structures. A photoresist mask is then patterned over the sensor and the portion of the hard-bias/lead structures above the ABS. The exposed hard-bias/lead material below the ABS is thinned or completely removed by milling. Preferably either the seed layer and/or a small portion of the hard-bias material is left to maintain the electrical connection to the ILG, which is located below the lapping gap, until the last portion of lapping.

BRIEF DESCRIPTION OF THE DRAWINGS

For a more complete understanding of the nature and advantages of the invention, as well as the preferred modes of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENTS

Figure 3A:
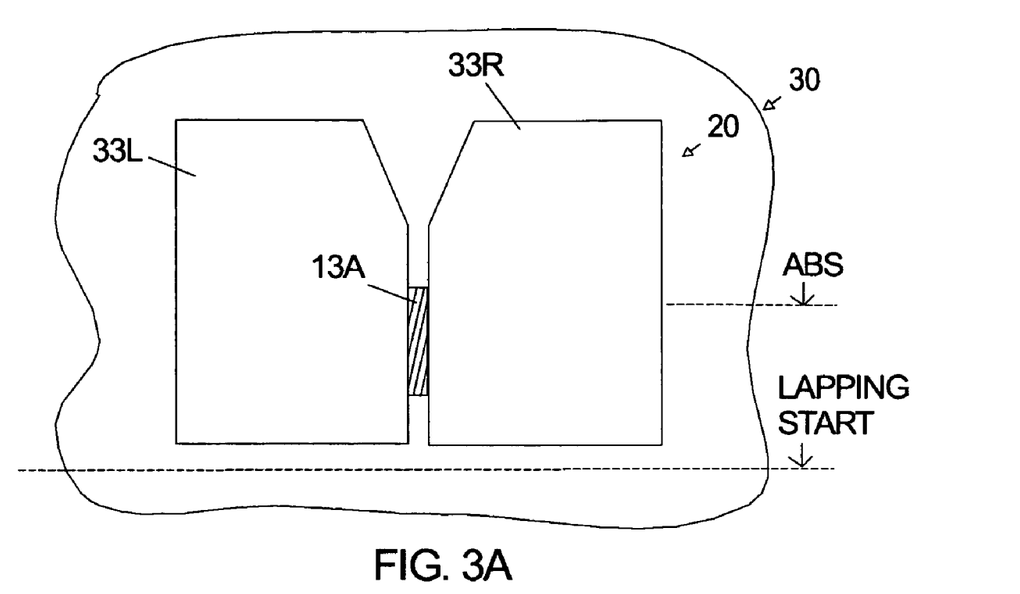
FIG. 3A is an illustration of the plan view of a head being manufactured according to a first embodiment the invention after the hard-bias/lead structures have been fabricated.

The invention can be used with a current-in-plane (CIP) sensor or a current-perpendicular-plane (CPP) sensor excluding the in-stack configuration. In the first embodiment of a method of the invention the hard-bias structures are fabricated first which defines the sensor width, then the sensor height is set in a lithographic process which forms the extended lapping gap. The hard-bias/lead material including the seed layer are deposited as in the prior art. The lead stitch is made last as in the prior art. FIG. 3A illustrates the shape of the hard-bias/lead structures 33L, 33R according to the first embodiment of the invention which will be described. The sensor layer stack is deposited over the wafer and then the upper and lower edges of the extended sensor stripe 13A are formed as in the prior art with a lithographic process. The hard-bias/lead structures 33L, 33R have been formed at the sides of the extended sensor stripe 13A after sensor material was etched away as in the prior art.

Figure 3B:
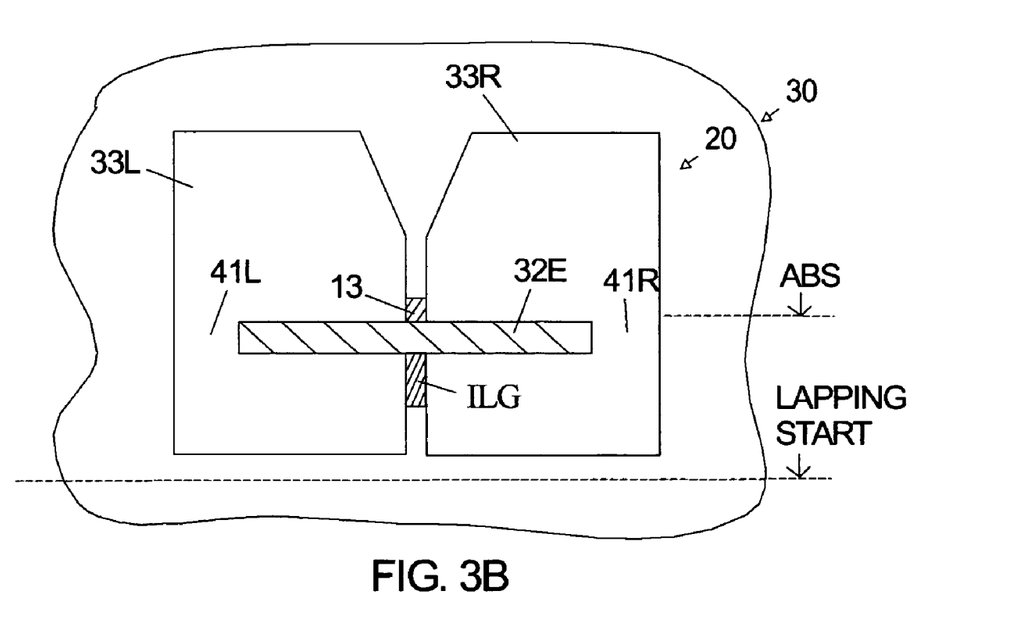
FIG. 3B is an illustration of the plan view of a head being manufactured according to a first embodiment the invention subsequent to FIG. 3A after the extended lapping gap has been formed.

FIG. 3B illustrates a subsequent point in the process after an extended lapping gap 32E has been formed according to the invention. The lapping gap 32E is formed by etching a trench through the extended sensor stripe 13A and into the hard-bias/leads 33L, 33R. The seed layer for the hard-bias material is preferably left in place. The upper edge of the lapping gap 32E is approximately the ABS line. The portion of the extended sensor stripe 13A remaining above the ABS is the embedded sensor 13. The portion of the extended sensor stripe 13A remaining below the ABS is the ILG. The electrical continuity through the ILG is required to ensure good yield of parts, since without it, the sensors tend to show significant damage from static charges. The extended lapping gap 32E is refilled preferably with alumina. The extended lapping gap 32E extends into the hard-bias/lead areas along the ABS line with a minimal width of material remaining at each side 41L, 41R to maintain electrical connection to the ILG. A lift-off process step follows to remove the mask and planarize the top surface.

Figure 3C:
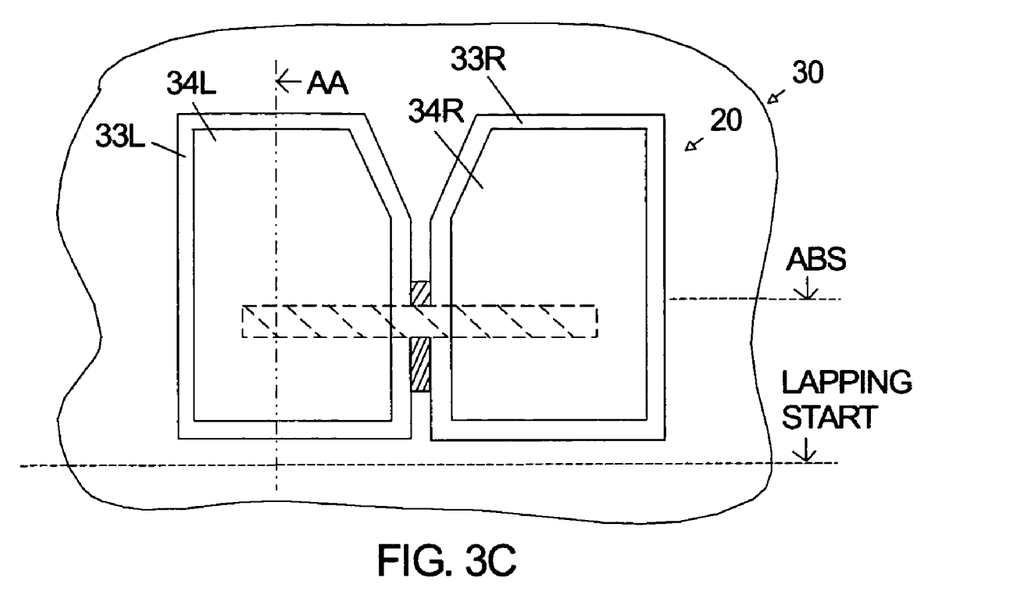
FIG. 3C is an illustration of the plan view of a head being manufactured according to a first embodiment the invention subsequent to FIG. 3B after the lead stitch pads have been formed.

FIG. 3C illustrates a subsequent point in the process after the lead stitches 34L, 34R have been formed as in the prior art. The extended lapping gap 32E is shown in phantom since it is under the lead stitches 34L, 34R.

Figure 3D:
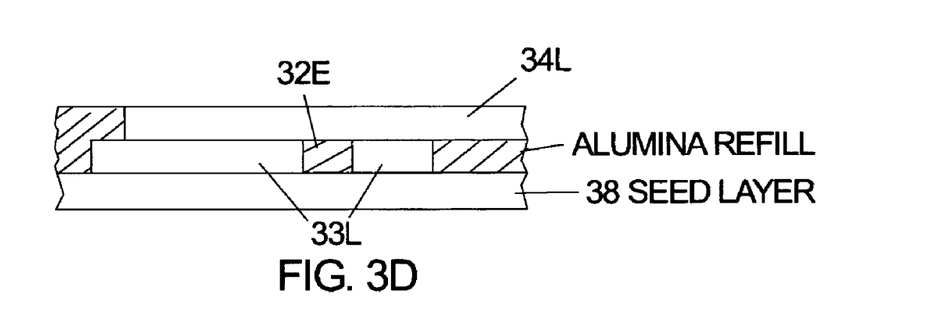
FIG. 3D is a symbolic illustration of a section (AA) view of the head of FIG. 3C taken perpendicular to the surface of the wafer.

FIG. 3D illustrates a section of the head taken along line AA perpendicular to the surface of the wafer. The lowest layer shown is the seed layer 38 for the hard-bias material. The extended lapping gap 32E cuts through the hard-bias/lead structure 33L. The lead stitch 34L is the upper layer at this point.

Figure 4:
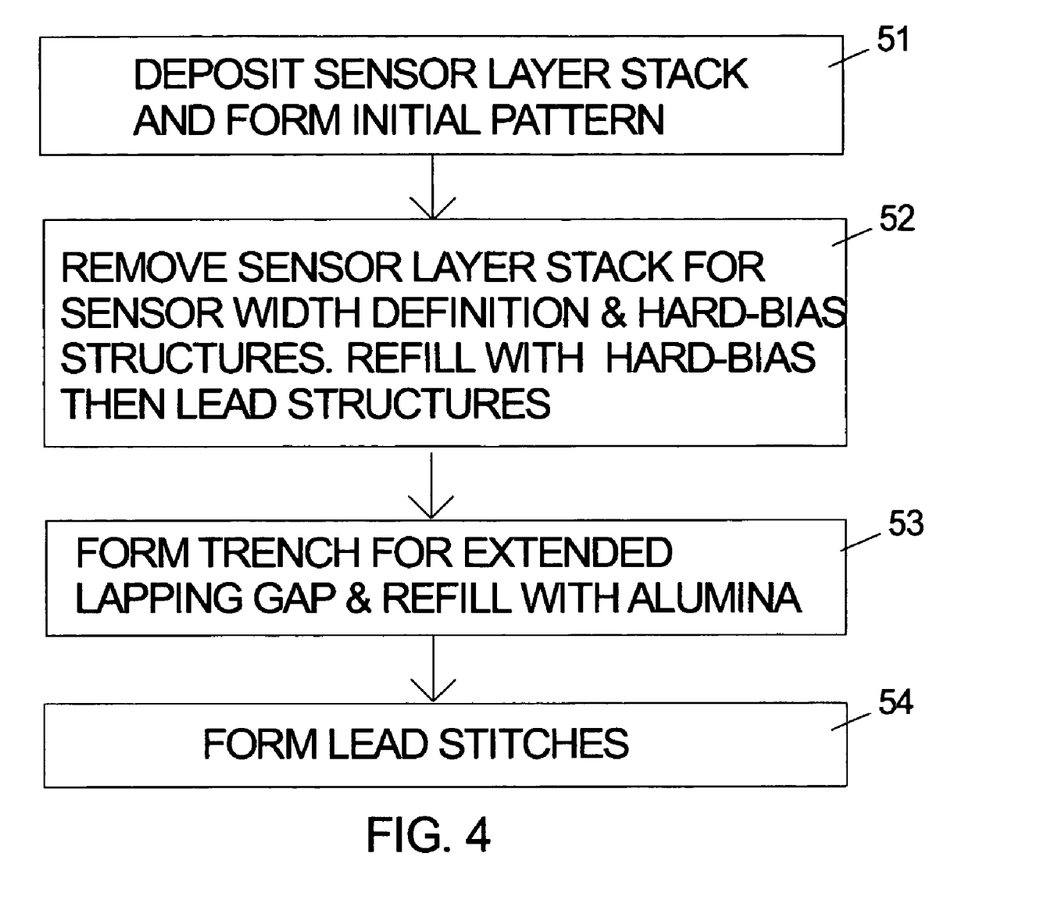
FIG. 4 is a flowchart of the first embodiment of a method according to the invention.

A flowchart of this embodiment of the method is shown in FIG. 4. The sensor layer stack is deposited over the entire wafer and patterned into an initial shape as in the prior art 51. Only the back edge of the sensor is defined at this stage. The sensor material must be removed from the areas for the hard-bias structures and the lapping gap. The hard-bias/lead structures are etched and refilled with the appropriate layer stack 52 at the sides of the sensor. The formation of the hard-bias/lead structures defines the width of the sensor. The extended lapping gap trench (void) is formed along the ABS and cuts through the sensor layer stack and the hard-bias/lead structures, but leaves the seed layer. The trench is refilled with alumina 53. The formation of the extended lapping gap defines the ABS edge of the sensor, so the sensor height is defined by lithography. A strip of the sensor layer stack extending between the hard-bias structures is left in place to serve as the ILG. After the extended lapping gap is formed, the lead stitches are formed as in prior art 54.

A typical hard-bias/lead layer stack for a current-in-plane (CIP) sensor includes alumina, a hard ferromagnetic material and the lead material in that order. If the total hard bias plus lead thickness is chosen so that the material is removed in the same amount of time required for the sensor layers to be removed from the cavity for the extended lapping gap, then the hard bias adjacent to the embedded sensor will be defined by lithography, not lapping. The in-line lapping guide in this embodiment is the remaining portion of the sensor layer stack which includes electrically conductive material. When lapping reaches the extended lapping gap, the electrical path will be broken as in the prior art. The left and right hard-bias/lead structures make electrical connection through the sensor after the ILG is removed. The electrical resistance between the left and right hard-bias/lead structures can be monitored to detect the point where lapping reaches the lapping gap causing the electrical resistance to change.

When the individual sliders are cut from the wafer and the material below the ABS line is removed by lapping. The extended lapping gap 32E is filled with alumina which is 3 times harder than the sensor material. The alumina provides protection for the hard-bias material against the abrasion of the diamond grits during lapping. With less stresses and damages in the hard-bias material the magnetic bias of the sensor is more stable which provides more consistent output amplitude and the percentage yield from the manufacturing line will be greater.

Figure 5A:
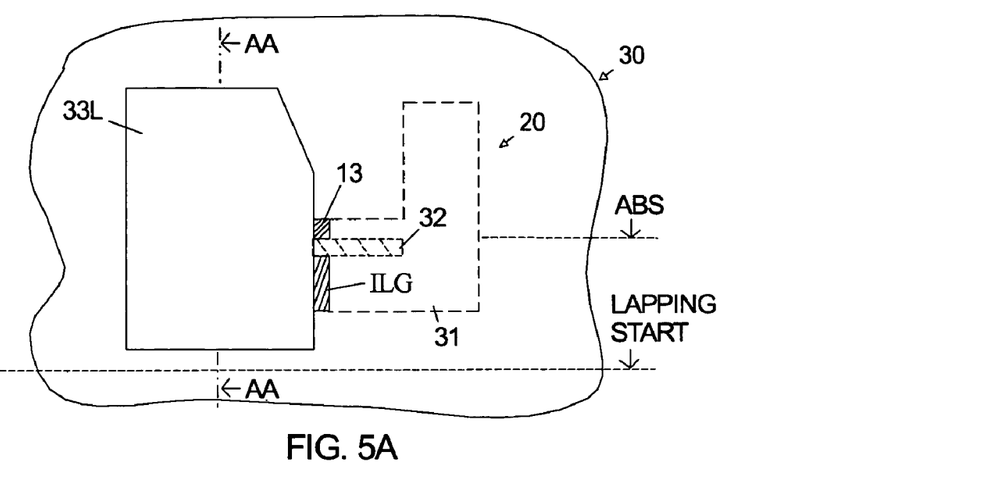
FIG. 5A is an illustration of the plan view of a head being manufactured according to a second embodiment the invention after the hard-bias/lead structures have been formed. Only the left hard-bias/lead structure is shown.

A second embodiment of the invention will now be described. In this embodiment the sensor height is defined prior to sensor width. After the hard-bias and lead structures have been formed, an additional phase is added to thin or remove the hard-bias and lead material beyond the ABS line. Before defining the lead stitch, a photoresist mask is added on top of the embedded sensor. Reference is made to FIG. 5A which will be used to illustrate the second embodiment of the invention. The sensor layer stack was deposited and patterned into the U-shape 31 which includes the lapping gap 32 filled with alumina. The lapping gap defines the sensor height. Only the left hard-bias/lead structure 33L is shown, but a mirror image right hard-bias/lead structure will also be present. The hard-bias/lead structures are formed along the sides of the sensor by removing the sensor and lapping gap material. Of the original U-shape pad of sensor material only the narrow portion between the left and right hard-bias structures remains. The hard-bias/lead structure is selected to be thinner than the sensor stack. The only portion of the sensor 13 and lapping gap 32 which remain are in the space between the two hard-bias/lead structures. The ILG area has the sensor stack at this point.

Figure 5B:
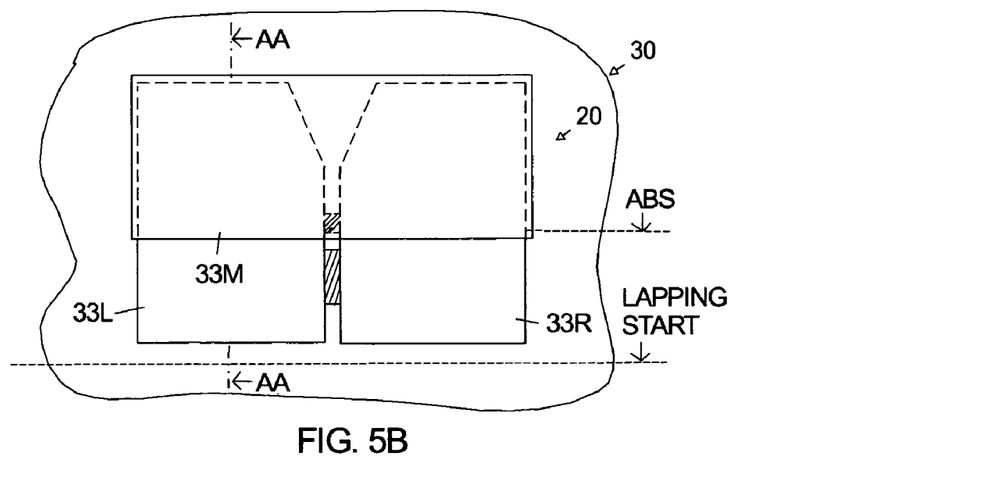
FIG. 5B is an illustration of the plan view of a head being manufactured according to a second embodiment the invention after the mask has been formed in preparation for milling the material below the ABS.
Figure 5C:
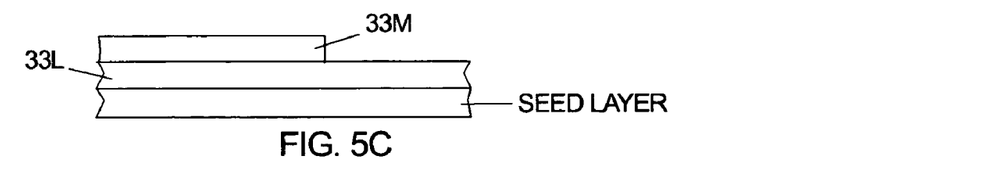
FIG. 5C is an illustration of the section view of the thin films in FIG. 5B taken along line M perpendicular to the wafer surface.

FIG. 5B shows the process at a subsequent stage. Both the left and right hard-bias/lead structures 33L, 33R are shown. The outline of photoresist mask 33M is shown according to this embodiment of the method of invention. The mask 33M is patterned to protect the hard-bias and lead structures which will remain in the finished head above the ABS while leaving the hard-bias/lead material and sensor material below the ABS exposed for milling. Ideally the photoresist line would coincide with or be very close to the ABS line, but inherent positioning errors make it preferable to place the target edge of the photoresist 33M slightly below the ABS line. FIG. 5C illustrates a section view along line M of the head taken perpendicular to the surface of the wafer. An ion-milling step is performed at this point followed by an alumina deposition and lift-off of the photoresist 33M.

Figure 5D:
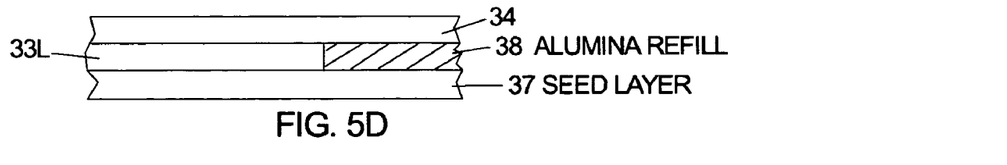
FIG. 5D is an illustration of the section view of the thin films taken along line AA subsequent to the ion-milling and alumina deposition according to a second embodiment the invention.

FIG. 5D illustrates a section view along line M of the wafer after the ion-milling described above has been performed, alumina has been deposited, the photoresist has been lifted-off and the conductive material for the lead stitch has been deposited. The outer edge of the hard-bias seed layer 37 extends beyond the hard-bias/lead structure 33 and the alumina refill material 38 has been deposited over both the hard-bias seed 37 and the hard-bias/lead structure 33.

Optionally, the photoresist mask 33M can be made with an aperture, so that a window of hard-bias/lead material is removed nearest to the ABS, but the original material is left further away from the ABS.

The combined hard bias and lead thickness is preferably chosen to be smaller than the total sensor height. After ion-milling the hard-bias and lead material is etched away in front of the sensor while the hard-bias seed-layer is left in place. The ion-milling time is selected to leave the conductive seed layer for the hard-bias in place. Because the sensor stack is thicker than the hard-bias plus the leads, after ion mill the ILG will be made of partially milled sensor material with an electrical connection through the seed layer at each side. This method has the advantage of leaving the hard-bias material intact at the sensor back edge and the precision is limited only by the overlay capability of the lithography tools.

Figure 6:
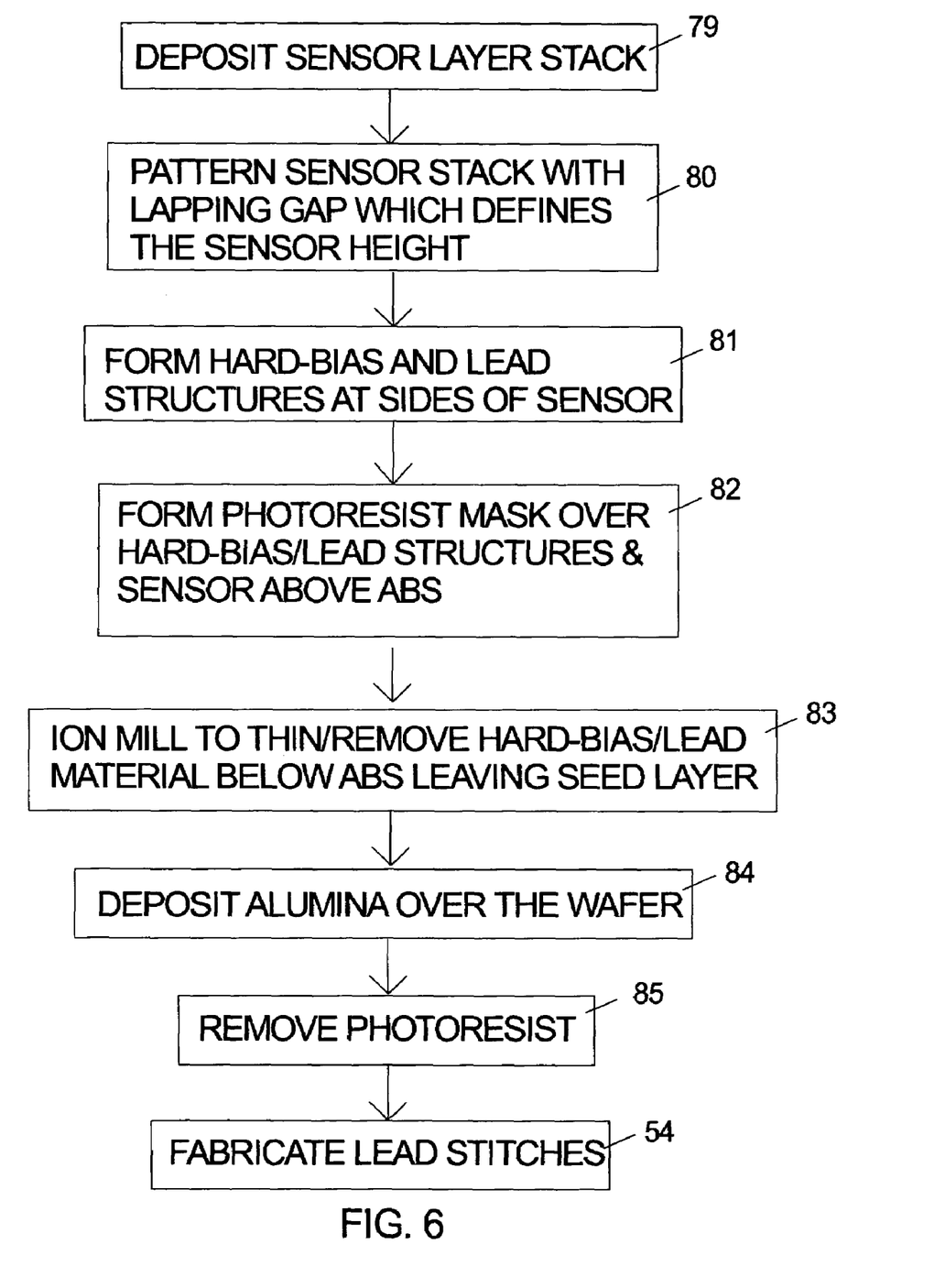
FIG. 6 is a flowchart of the second embodiment of a method according to the invention.

FIG. 6 is a flowchart of the steps in the second embodiment of the invention. The step numbers from FIG. 4 have been maintained where the steps are the same. The sensor layer stack is deposited as in the prior art 79. The mask used to initially pattern the sensor layer stack includes the lapping gap and defines the sensor height 80. The hard-bias and lead structures are formed as in the prior art except that the combined thickness is made less than the thickness of the sensor layer stack 81. A photoresist mask is formed over the hard-bias/lead structures and the sensor above the ABS 82. The exposed hard-bias and lead structures below the ABS are thinned or removed by ion-milling 83. Preferably the seed layer is left along with a portion of the sensor layer stack to serve as the ILG. A full film of alumina is deposited over the wafer 83 and the photoresist is lifted off 84 and lead stitches are formed as in the prior art 54. The prior art process is resumed at this point.

Except where express materials, thickness values, etc., have been given above, the layers, structures and materials in a slider embodying the invention are according to the prior art and are fabricated according to the prior art. Although the embodiments of the invention have been described in a particular embodiment, the invention as described herein is not limited to this application and various changes and modifications will be apparent to those skilled in the art which will be within the scope of the invention.

What is claimed is:

1. A method of fabricating a magnetic head comprising the steps of:

fabricating a stack of layers for the magnetic sensor for a magnetic head on a wafer into an initial shape that extends below a predetermined ABS plane for the magnetic head;

fabricating left and right hard-bias/lead structures on left and right sides of the magnetic sensor, the left and right hard-bias/lead structures extending below the predetermined ABS plane;

removing a portion of the hard-bias/lead structures and the magnetic sensor below the predetermined ABS plane forming a void for a lapping gap extending from the left hard-bias/lead structure across the magnetic sensor and into the right hard-bias/lead structure, the void having an edge approximately aligned with the predetermined ABS plane;

refilling the void with a selected material to form the lapping gap and define a height of the magnetic sensor;

forming leads for the magnetic sensor;

separating the magnetic head from the wafer to expose a surface for lapping; and lapping the surface of magnetic head to remove at least a portion of the lapping gap to expose the predetermined ABS plane.

2. The method of claim 1 wherein the step of removing the portion of the hard-bias/lead structures and the magnetic sensor further comprises fabricating the lapping gap extending partially into the left hard-bias/lead structure across the sensor and partially into the right hard-bias/lead structure leaving a portion of the left hard-bias/lead structure and a portion of the right hard-bias/lead structure extending beyond the predetermined ABS plane and beyond the lapping gap and forming part of an electrical lapping guide.

3. The method of claim 1 wherein the step of removing the portion of the hard-bias/lead structures and the magnetic sensor further comprises removing the magnetic sensor material and the hard-bias/lead material and leaving a seed layer.

4. The method of claim 1 wherein a thickness of the hard-bias/lead structures is selected so that material comprising the hard-bias/lead structures and material comprising the stack of layers for the sensor is removed in approximately a same amount of time during fabrication of the void for the lapping gap.

5. The method of claim 1 wherein the left and right hard-bias/lead structures make an electrical connection through a portion of the material in the stack of layers for the sensor below the predetermined ABS plane and below the lapping gap to form an in-line lapping guide, and the step of lapping further comprising monitoring the in-line lapping guide to determine when lapping has reached the lapping gap.

6. The method of claim 5 wherein the step of lapping further comprises monitoring the electrical resistance between the left and right hard-bias/lead structures to detect a point where lapping reaches the lapping gap causing the electrical connection to be broken.

7. The method of claim 1 wherein the step of removing the portion of the hard-bias/lead structures further comprises the steps of:

fabricating a mask over the magnetic sensor and a selected area of the hard-bias/lead structure above the predetermined ABS plane; and milling a selected second area of the hard-bias/lead structure located below the predetermined ABS plane to remove all or part of the hard-bias/lead structure in the selected second area.

8. The method of claim 7 wherein after milling the selected second area, an electrical connection exists between the left and right hard-bias/lead structures below the predetermined ABS plane forming an in-line lapping guide.

* * * * *